United States Patent
Yuan et al.

(10) Patent No.: US 10,432,356 B2
(45) Date of Patent: Oct. 1, 2019

(54) DATA TRANSMITTING OR RECEIVING METHOD AND DEVICE FOR DUAL TBS, TRANSMITTER AND RECEIVER

(71) Applicant: ZTE Corporation, Shenzhen (CN)

(72) Inventors: Zhifeng Yuan, Shenzhen (CN); Jianqiang Dai, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 33 days.

(21) Appl. No.: 15/523,461

(22) PCT Filed: Jul. 7, 2015

(86) PCT No.: PCT/CN2015/083494
§ 371 (c)(1),
(2) Date: May 1, 2017

(87) PCT Pub. No.: WO2016/065922
PCT Pub. Date: May 6, 2016

(65) Prior Publication Data
US 2017/0324513 A1    Nov. 9, 2017

(30) Foreign Application Priority Data
Oct. 30, 2014 (CN) .......................... 2014 1 0604235

(51) Int. Cl.
*H04B 7/02* (2018.01)
*H04L 1/00* (2006.01)
(Continued)

(52) U.S. Cl.
CPC .......... *H04L 1/0058* (2013.01); *H04B 17/10* (2015.01); *H04B 17/12* (2015.01); *H04B 17/20* (2015.01);
(Continued)

(58) Field of Classification Search
CPC ... H04L 1/0058; H04L 1/0009; H04L 27/183; H04L 27/3416; H04L 27/3461;
(Continued)

(56) References Cited

U.S. PATENT DOCUMENTS

2004/0028020 A1   2/2004 Frederiksen
2010/0103920 A1*  4/2010 Damnjanovic ....... H04L 1/0026
                                                  370/344
(Continued)

FOREIGN PATENT DOCUMENTS

CN    101527620 A    9/2009
CN    101541011 A    9/2009
(Continued)

OTHER PUBLICATIONS

International Search Report for corresponding application PCT/CN2015/083494 filed on Jul. 7, 2015; dated Oct. 10, 2015.
(Continued)

*Primary Examiner* — Zewdu A Kassa
(74) *Attorney, Agent, or Firm* — Cantor Colburn LLP

(57) ABSTRACT

Provided are a data transmitting or receiving method and device for dual Transport Blocks (TBs), a transmitter and a receiver. Data to be transmitted is divided into two portions, where transport blocks TB1 and TB2 are generated respectively according to a corresponding predetermined Modulation Coding Scheme (MCS) for each portion. The TB1 is modulated into an amplitude weighted complex symbol sequence S1, and the TB2 is modulated into an amplitude weighted complex symbol sequence S2. The S1 and the S2 are superposed to generate a complex symbol sequence S3 corresponding to a new TB, where the complex symbol sequence S3 corresponding to the new TB possesses Gray properties. The new TB is transmitted to a receiver.

10 Claims, 8 Drawing Sheets

(51) Int. Cl.
| | |
|---|---|
| *H04L 27/18* | (2006.01) |
| *H04L 27/34* | (2006.01) |
| *H04W 52/34* | (2009.01) |
| *H04B 17/10* | (2015.01) |
| *H04B 17/12* | (2015.01) |
| *H04B 17/20* | (2015.01) |
| *H04B 1/10* | (2006.01) |
| *H04W 52/04* | (2009.01) |
| *H04W 52/16* | (2009.01) |
| *H04L 27/00* | (2006.01) |
| *H04L 27/04* | (2006.01) |

(52) U.S. Cl.
CPC .......... *H04L 1/0009* (2013.01); *H04L 27/183* (2013.01); *H04L 27/3416* (2013.01); *H04L 27/3461* (2013.01); *H04L 27/3488* (2013.01); *H04W 52/346* (2013.01); *H04B 1/1027* (2013.01); *H04L 1/0003* (2013.01); *H04L 1/0004* (2013.01); *H04L 1/0005* (2013.01); *H04L 27/0008* (2013.01); *H04L 27/04* (2013.01); *H04L 2001/0098* (2013.01); *H04W 52/04* (2013.01); *H04W 52/16* (2013.01)

(58) Field of Classification Search
CPC ..... H04L 27/3488; H04B 17/10; H04B 17/12; H04B 17/20; H04W 52/346
USPC ................ 375/267, 260, 259, 316, 295, 219
See application file for complete search history.

(56) References Cited

U.S. PATENT DOCUMENTS

| | | | |
|---|---|---|---|
| 2011/0075753 | A1 | 3/2011 | Jung |
| 2016/0191174 | A1* | 6/2016 | Hwang ................. H04B 15/00 375/348 |

FOREIGN PATENT DOCUMENTS

| | | |
|---|---|---|
| CN | 102215090 A | 10/2011 |
| CN | 102387106 A | 3/2012 |
| CN | 102771061 A | 11/2012 |
| CN | 102868482 A | 1/2013 |
| EP | 2890069 A1 | 7/2015 |
| WO | 0139456 A1 | 5/2001 |
| WO | 2014030501 A1 | 2/2014 |

OTHER PUBLICATIONS

European Search Report for corresponding application EP 15 85 4680; dated Oct. 19, 2019.

Jiang H, "A Hierarchical Modulation for Upgrading Digital Broadcast Systems", IEEE Transactions on Broadcasting, IEEE Service Center, vol. 51, No. 2, Jun. 1, 2005, XP011132694.

Jongkyung Kim, "Successive MAP Detection with Soft Interferemce Cancellation for Iterative Receivers in Hierarchical M-ary QAM Systems", 2009 IEEE 70th Vehicular Technology Conference, Sep. 1, 2009, pp. 1-5, XP055412779.

* cited by examiner

A transmitting signal from a transmitter is received, where the transmitting signal is a new TB generated at the transmitter by superposing, after dividing data to be transmitted into two portions, transport blocks TB1 and TB2 corresponding to each portion on the transmitter, the TB1 is modulated into an amplitude weighted complex symbol sequence S1, the TB2 is modulated into an amplitude weighted complex symbol sequence S2, the S1 and the S2 are superposed to generate a complex symbol sequence S3 corresponding to the new TB, and the complex symbol sequence S3 corresponding to the new TB possesses Gray properties ⸺ S302

Two TBs are demodulated out by using an SIC method ⸺ S304

Fig. 3

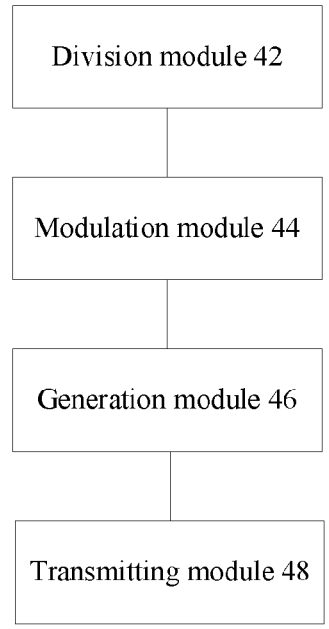

Fig. 4

DATA TRANSMITTING OR RECEIVING METHOD AND DEVICE FOR DUAL TBS, TRANSMITTER AND RECEIVER

TECHNICAL FIELD

The present disclosure relates to the field of communications, and more particularly to a data transmitting or receiving method and device for dual Transport Blocks (TBs), a transmitter and a receiver.

BACKGROUND

In wireless communications between a base station and a User Equipment (UE), one TB that is capable of matching a channel and has a certain Modulation Coding Scheme (MCS), i.e., a certain spectral efficiency may be obtained in one transmission according to a channel situation between the base station and the UE. Therefore, cellular communication standards explicitly stipulate a set of MCS to match different radio channels. In practical communications, practical channel quality may be good. If the UE is in the center of a cell, the channel quality is higher than that needed by a maximum MCS in the standard. Under the existing MCS standard, when Signal to Noise Ratio (SNR) conditions of the UE in the cell are good or a transmitting power is redundant, the spectral efficiency may not reach optimum level due to the incapability of selecting a higher modulation scheme or making full use of the transmitting power. If the UE or the base station is allowed to transmit multiple TBs to the opposite party simultaneously, the spectral efficiency may be further improved without modifying an MCS standard definition. For example, if two TBs are superposed, an enough transmission power may be provided for the first TB, and a redundant power is allocated to the other TB, then the receiving party may separate the two TBs by using a Successive Interference Cancellation (SIC) technology.

The two TBs are transmitted over the same time-frequency resources, and during demodulation, the two TBs interfere with each other. In related communication technologies, two demodulation methods are provided. In the first method, each TB with interference from other TBs is demodulated. The implementation of the first method is simpler, but the performance is defective. In the second method, an SIC technology is used. Simple descriptions will be made by taking an interference cancellation process of two TBs as an example, and an interference cancellation process of multiple TBs is easy to be derived accordingly. In the interference cancellation process of two TBs, demodulation and decoding is firstly conducted to obtain information of TB1 (demodulating TB1 information with interference from TB2). Then, when TB2 information is demodulated, the TB1 information (which probably needs to be reconstructed) demodulated and decoded previously is subtracted from the TB2 information before the TB2 information is demodulated. Thus, the performance of the TB2 information may be greatly improved because of the cancellation of interference. Therefore, dual TBs may be received by using the SIC technology usually.

The two TBs are transmitted after being directly superposed. However, the finally-combined constellation points obtained in this direct superposition mode do not possess Gray mapping (adjacent mapped constellation points are different only in one bit, which makes optimal modulation performance) properties. FIG. 1 is a schematic diagram of a mode of directly superposing Quadrature Phase Shift Keying (QPSK) symbols and 16 Quadrature Amplitude Modulation (QAM) symbols in related communication technologies. As shown in FIG. 1, if a receiving end performs receiving by using an SIC, it may easily make mistakes to demodulate constellation points that do not possess Gray mapping properties. Although the SIC-based receiving may tolerate error propagation, the error propagation of a degree of 10% BLER cannot be omitted.

Therefore, the problem where constellation points finally combined by directly superposing two TBs do not possess Gray mapping properties exists in related communication technologies.

SUMMARY

Some embodiments of the present disclosure provide a data transmitting or receiving method and device for dual TBs, a transmitter and a receiver, which at least solve the problem in related communication technologies where constellation points finally combined by directly superposing two TBs do not possess Gray mapping properties.

According to an embodiment of the present disclosure, a data transmitting method for dual TBs is provided, which may include the following acts. Data to be transmitted is divided into two portions, where transport blocks TB1 and TB2 are generated respectively according to a corresponding predetermined MCS for each portion. The TB1 is modulated into an amplitude weighted complex symbol sequence S1, and the TB2 is modulated into an amplitude weighted complex symbol sequence S2. The S1 and the S2 are superposed to generate a complex symbol sequence S3 corresponding to a new TB, where the complex symbol sequence S3 corresponding to the new TB possesses Gray properties. The new TB is transmitted to a receiver.

In an exemplary embodiment, before the new TB is transmitted to the receiver, the method may further include an act of adjusting the complex symbol sequence S3 corresponding to the new TB according to respective power adjustment factors $\sqrt{P1}$ and $\sqrt{P2}$ corresponding to the TB1 and the TB2, where $\sqrt{P1} > \sqrt{P2}$.

In an exemplary embodiment, the act of superposing the S1 and the S2 to generate the complex symbol sequence S3 corresponding to the new TB may include the following acts. When the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is $Xstd+Ystd \cdot i$, the S1 and the S2 are superposed to generate the complex symbol sequence S3 expressed as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, where a symbol $\lceil \cdot \rceil$ represents rounding up to an integer, and $\sqrt{P1}$ and $\sqrt{P2}$ are the respective power adjustment factors corresponding to the TB1 and the TB2.

In an exemplary embodiment, the act of superposing the S1 and the S2 to generate the complex symbol sequence S3 corresponding to the new TB may include the following acts. When the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is $Xstd+Ystd \cdot i$, the S1 and the S2 are superposed to generate the complex symbol sequence S3 expressed as $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, where a symbol $\lfloor \cdot \rfloor$ represents rounding down to an integer, and $\sqrt{P1}$ and $\sqrt{P2}$ are the respective power adjustment factors corresponding to the TB1 and the TB2.

In an exemplary embodiment, the act of superposing the S1 and the S2 to generate the complex symbol sequence S3 corresponding to the new TB may include the following acts. The S2 is flipped to obtain a symbol S. The S1 and the S are superposed to generate the S3 corresponding to the new TB.

In an exemplary embodiment, the symbol S may be obtained by flipping the S2 in a following manner: determining a sign of a real part of the S according to a value of a real part of the S1, determining a sign of an imaginary part of the S according to a value of an imaginary part of the S1, and flipping the amplitude weighted complex symbol sequence S2 to obtain the symbol S expressed as $\sqrt{P2} \cdot [(-1)^{\lceil Xstd/2 \rceil} \cdot x2 + (-1)^{\lceil Ystd/2 \rceil} \cdot y2 \cdot i]$ or $\sqrt{P2} \cdot [(-1)^{\lfloor Xstd/d \rfloor} \cdot x2 + (-1)^{\lfloor Ystd/2 \rfloor} \cdot y2 \cdot i]$, where a non-normalized integer lattice constellation symbol $S_{std}$ corresponding to the S1 is $Xstd + Ystd \cdot i$, and the symbol S and the amplitude weighted complex symbol sequence S2 are identical in power.

In an exemplary embodiment, the amplitude weighted complex symbol sequence S1 may be obtained by multiplying a power-normalized modulation symbol sequence, obtained by modulating the TB1 by a power-normalized constellation graph, by a power adjustment factor; and the amplitude weighted complex symbol sequence S2 may be obtained by multiplying a power-normalized modulation symbol sequence, obtained by modulating the TB2 by a power-normalized constellation graph, by a power adjustment factor.

In an exemplary embodiment, values of Xstd and Ystd may include at least one of the following: values of Xstd and Ystd corresponding to QPSK which are $\{1, -1\}$; values of Xstd and Ystd corresponding to 16QAM which are $\{1, -1, 3, -3\}$; or values of Xstd and Ystd corresponding to 64QAM which are $\{1, -1, 3, -3, 5, -5, 7, -7\}$.

According to another embodiment of the present disclosure, a data receiving method for dual TBs is provided, which may include the following acts. A transmitting signal is received from a transmitter, where the transmitting signal is a new TB generated at the transmitter by superposing, after dividing data to be transmitted into two portions, transport blocks TB1 and TB2 corresponding to each portion on the transmitter, the TB1 is modulated into an amplitude weighted complex symbol sequence S1, the TB2 is modulated into an amplitude weighted complex symbol sequence S2, the S1 and the S2 are superposed to generate a complex symbol sequence S3 corresponding to the new TB, and the complex symbol sequence S3 corresponding to the new TB possesses Gray properties. Two TBs are demodulated out by using an SIC method.

In an exemplary embodiment, the act of demodulating the two TBs out by using the SIC method may include the following acts. TB1 information is demodulated out with interference from TB2 information, and after the TB1 information is removed by using the SIC method, the TB2 information is demodulated out by flipping.

In an exemplary embodiment, the act of demodulating TB1 information out with interference from TB2 information and after removing the TB1 information by using the SIC method, demodulating the TB2 information out by flipping may include the following acts. When the TB1 information demodulated is $x1'+y1' \cdot i$, information obtained by removing the TB1 information is $x2'+y2' \cdot i$, and a non-normalized integer lattice constellation symbol $S_{std}'$ corresponding to the TB1 is $Xstd'+Ystd' \cdot i$, a flipped output signal expressed as $(-1)^{\lceil Xstd''/2 \rceil} \cdot x2' + (-1)^{\lceil Ystd''/2 \rceil} \cdot y2' \cdot i$ or $(-1)^{\lfloor Xstd''/2 \rfloor} \cdot x2' + (-1)^{\lfloor Ystd''/2 \rfloor} \cdot y2' \cdot i$ is obtained, where a symbol $\lceil \cdot \rceil$ represents rounding up to an integer, and a symbol $\lfloor \cdot \rfloor$ represents rounding down to an integer.

In an exemplary embodiment, values of Xstd' and Ystd' may include at least one of the following: values of Xstd' and Ystd' corresponding to QPSK which are $\{1, -1\}$; values of Xstd' and Ystd' corresponding to 16QAM which are $\{1, -1, 3, -3\}$; or values of Xstd' and Ystd' corresponding to 64QAM which are $\{1, -1, 3, -3, 5, -5, 7, -7\}$.

According to still another embodiment of the present disclosure, a data transmitting device for dual TBs is provided, which may include: a division module, arranged to divide data to be transmitted into two portions, where transport blocks TB1 and TB2 are generated respectively according to a corresponding predetermined MCS for each portion; a modulation module, arranged to modulate the TB1 into an amplitude weighted complex symbol sequence S1, and modulate the TB2 into an amplitude weighted complex symbol sequence S2; a generation module, arranged to superpose the S1 and the S2 to generate a complex symbol sequence S3 corresponding to a new TB, where the complex symbol sequence S3 corresponding to the new TB possesses Gray properties; and a transmitting module, arranged to transmit the new TB to a receiver.

In an exemplary embodiment, the device may further include: an adjustment module, arranged to adjust the complex symbol sequence S3 corresponding to the new TB according to respective power adjustment factors $\sqrt{P1}$ and $\sqrt{P2}$ corresponding to the TB1 and the TB2, where $\sqrt{P1} > \sqrt{P2}$.

In an exemplary embodiment, the generation module may be further arranged to superpose the S1 and the S2 to generate the complex symbol sequence S3 corresponding to the new TB in a following manner: when the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is $Xstd+Ystd \cdot i$, superposing the S1 and the S2 to generate the complex symbol sequence S3 expressed as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, where a symbol $\lceil \cdot \rceil$ represents rounding up to an integer, and $\sqrt{P1}$ and $\sqrt{P2}$ are the respective power adjustment factors corresponding to the TB1 and the TB2.

In an exemplary embodiment, the generation module may be further arranged to superpose the S1 and the S2 to generate the complex symbol sequence S3 corresponding to the new TB in a following manner: when the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is $Xstd+Ystd \cdot i$, superposing the S1 and the S2 to generate the complex symbol sequence S3 expressed as $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, where a symbol $\lfloor \cdot \rfloor$ represents rounding down to an integer, and $\sqrt{P1}$ and $\sqrt{P2}$ are the respective power adjustment factors corresponding to the TB1 and the TB2.

In an exemplary embodiment, the generation module may include: an obtaining unit, arranged to flip the S2 to obtain a symbol S; and a generation unit, arranged to superpose the S1 and the S to generate the S3 corresponding to the new TB.

In an exemplary embodiment, the obtaining unit may be further arranged to obtain the symbol S by flipping the S2 in a following manner: determining a sign of a real part of the S according to a value of a real part of the S1, determining a sign of an imaginary part of the S according to a value of an imaginary part of the S1, and flipping the amplitude weighted complex symbol sequence S2 to obtain the symbol S expressed as $\sqrt{P1} \cdot [(-1)^{\lfloor Xstd/2 \rfloor} \cdot x2 + (-1)^{\lfloor Ystd/2 \rfloor} \cdot y2 \cdot i]$ or $\sqrt{P2} \cdot [(-1)^{\lfloor Xstd/2 \rfloor} \cdot x2 + (-1)^{\lfloor Ystd/2 \rfloor} \cdot y2 \cdot i]$, where a non-normalized integer lattice constellation symbol $S_{std}$ corresponding to the S1 is $Xstd + Ystd \cdot i$, and the symbol S and the amplitude weighted complex symbol sequence S2 are identical in power.

In an exemplary embodiment, the amplitude weighted complex symbol sequence S1 may be obtained by multiplying a power-normalized modulation symbol sequence, obtained by modulating the TB1 by a power-normalized constellation graph, by a power adjustment factor; and the amplitude weighted complex symbol sequence S2 may be obtained by multiplying a power-normalized modulation symbol sequence, obtained by modulating the TB2 by a power-normalized constellation graph, by a power adjustment factor.

In an exemplary embodiment, values of Xstd and Ystd may include at least one of the following: values of Xstd and Ystd corresponding to QPSK which are {1, −1}; values of Xstd and Ystd corresponding to 16QAM which are {1, −1, 3, −3}; or values of Xstd and Ystd corresponding to 64QAM which are {1, −1, 3, −3, 5, −5, 7, −7}.

According to still another embodiment of the present disclosure, a transmitter is provided, which may include the device according to any one of the foregoing embodiments and exemplary embodiment.

According to still another embodiment of the present disclosure, a data receiving device for dual TBs is provided, which may include: a receiving device, arranged to receive a transmitting signal from a transmitter, where the transmitting signal is a new TB generated at the transmitter by superposing, after dividing data to be transmitted into two portions, transport blocks TB1 and TB2 corresponding to each portion on the transmitter, the TB1 is modulated into an amplitude weighted complex symbol sequence S1, the TB2 is modulated into an amplitude weighted complex symbol sequence S2, the S1 and the S2 are superposed to generate a complex symbol sequence S3 corresponding to the new TB, and the complex symbol sequence S3 corresponding to the new TB possesses Gray properties; and a demodulation module, arranged to demodulate two TBs out by using an SIC method.

In an exemplary embodiment, the demodulation module may include: a demodulation unit, arranged to demodulate TB1 information out with interference from TB2 information, and demodulate, after removing the TB1 information by using the SIC method, the TB2 information out by flipping.

In an exemplary embodiment, the demodulation unit may be further arranged to demodulate TB1 information out with interference from TB2 information and demodulate, after removing the TB1 information by using the SIC method, the TB2 information out by flipping in a following manner: when the TB1 information demodulated is x1′+y1′·i, information obtained by removing the TB1 information is x2′+·y2′·i, and a non-normalized integer lattice constellation symbol $S_{std}'$ corresponding to the TB1 is Xstd′+Ystd′·i, obtaining a flipped output signal expressed as $(-1)^{\lfloor Xstd''/2 \rfloor} \cdot x2' + (-1)^{\lfloor Ystd''/2 \rfloor} \cdot y2' \cdot i$ or $(-1)^{\lfloor Xstd''/2 \rfloor} \cdot x2' + (-1)^{\lfloor Ystd''/2 \rfloor} \cdot y2' \cdot i$, where a symbol $\lceil \cdot \rceil$ represents rounding up to an integer, and a symbol $\lfloor \cdot \rfloor$ represents rounding down to an integer.

In an exemplary embodiment, values of Xstd′ and Ystd′ may include at least one of the following: values of Xstd′ and Ystd′ corresponding to QPSK which are {1, −1}; values of Xstd′ and Ystd′ corresponding to 16QAM which are {1, −1, 3, −3}; or values of Xstd′ and Ystd′ corresponding to 64QAM which are {1, −1, 3, −3, 5, −5, 7, −7}.

According to still another embodiment of the present disclosure, a receiver is provided, which may include the device according to any one of the foregoing embodiments and exemplary embodiment.

By means of the embodiments of the present disclosure, data to be transmitted is divided into two portions, where transport blocks TB1 and TB2 are generated respectively according to a corresponding predetermined MCS for each portion; the TB1 is modulated into an amplitude weighted complex symbol sequence S1, and the TB2 is modulated into an amplitude weighted complex symbol sequence S2; the S1 and the S2 are superposed to generate a complex symbol sequence S3 corresponding to a new TB, where the complex symbol sequence S3 corresponding to the new TB possesses Gray properties; and the new TB is transmitted to a receiver. The problem in related communication technologies where constellation points finally combined by directly superposing two TBs do not possess Gray mapping properties is solved, thus achieving the effects of improving the spectral efficiency, endowing superposed symbol constellation points with Gray properties, improving the SIC demodulation performance, and allocating different powers to different data streams.

BRIEF DESCRIPTION OF THE DRAWINGS

The drawings described herein are adopted to provide further understanding of the present disclosure, and form a part of the present application. In the drawings:

FIG. 3 is a flowchart of a data receiving method for dual TBs according to an embodiment of the present disclosure;

FIG. 4 is a block diagram of a data transmitting device for dual TBs according to an embodiment of the present disclosure;

DETAILED DESCRIPTION OF THE EMBODIMENTS

The present disclosure will be described hereinbelow with reference to the drawings and in conjunction with embodiments in detail. It is important to note that embodiments in the present application and features in the embodiments may be combined under the condition of no conflicts.

Figure 1:
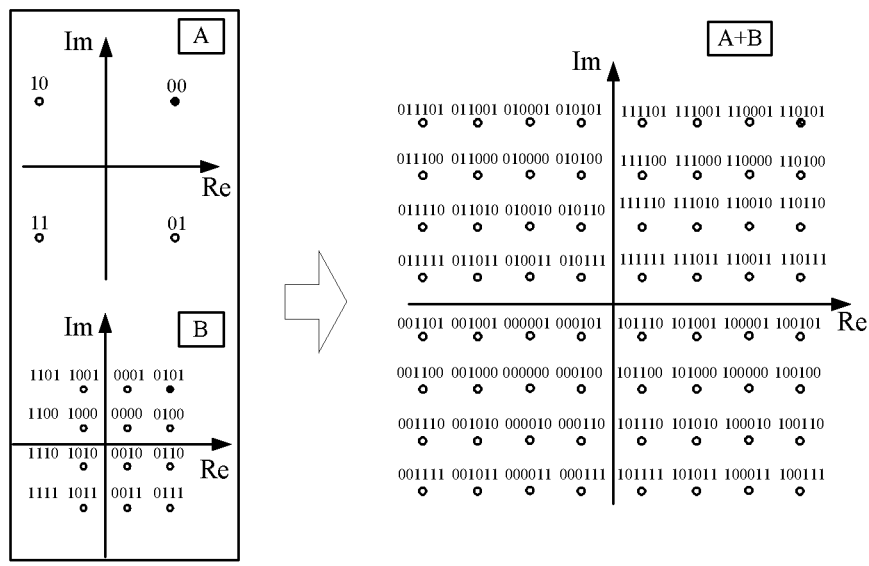
FIG. 1 is a schematic diagram of a mode of directly superposing QPSK symbols and 16QAM symbols in related communication technologies.
Figure 2:
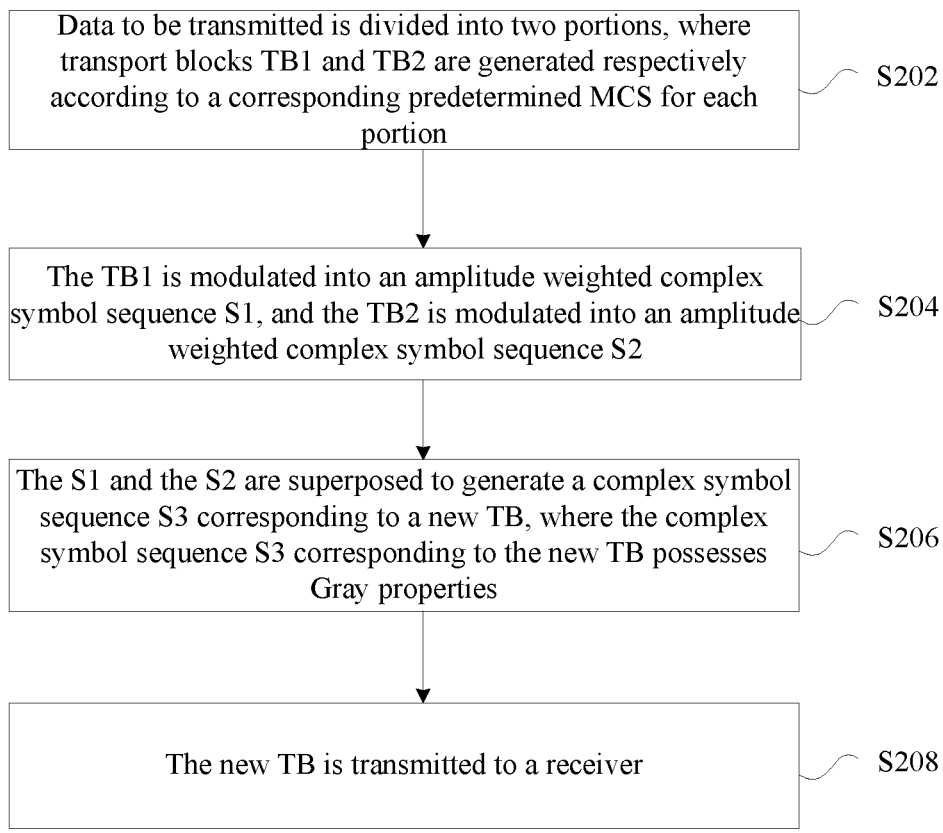
FIG. 2 is a flowchart of a data transmitting method for dual TBs according to an embodiment of the present disclosure.

In the present embodiment, a data transmitting method for dual TBs is provided. FIG. 2 is a flowchart of a data transmitting method for dual TBs according to an embodiment of the present disclosure. As shown in FIG. 2, the flow may include the acts S202 to S208 as follows.

At act S202, data to be transmitted is divided into two portions, where transport blocks TB1 and TB2 are generated respectively according to a corresponding predetermined MCS for each portion.

At act S204, the TB1 is modulated into an amplitude weighted complex symbol sequence S1, and the TB2 is modulated into an amplitude weighted complex symbol sequence S2.

At act S206, the S1 and the S2 are superposed to generate a complex symbol sequence S3 corresponding to a new TB, where the complex symbol sequence S3 corresponding to the new TB possesses Gray properties.

At act S208, the new TB is transmitted to a receiver.

By means of the abovementioned acts, two TBs are superposed, and the superposed complex symbol sequence is made to possess Gray properties. The problem in related communication technologies where constellation points finally combined by directly superposing two TBs do not possess Gray mapping properties is solved, thus achieving the effects of improving the spectral efficiency, endowing superposed symbol constellation points with Gray properties, improving the SIC demodulation performance, and allocating different powers to different data streams.

In an exemplary embodiment, before the new TB is transmitted to the receiver, the complex symbol sequence S3 corresponding to the new TB may be adjusted according to respective power adjustment factors $\sqrt{P1}$ and $\sqrt{P2}$ corresponding to the TB1 and the TB2, where $\sqrt{P1} > \sqrt{P2}$.

The S1 and the S2 may be superposed to generate the complex symbol sequence S3 corresponding to the new TB in multiple manners, which will be illustrated hereinbelow.

For example, the following manner may be adopted. When the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2}(x2+y2 \cdot i)$, and a non-normalized integer lattice constellation symbol $S_{std}$ corresponding to the S1 is $Xstd+Ystd \cdot i$, the S1 and the S2 may be superposed to generate the complex symbol sequence S3 expressed as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, where a symbol $\lceil \cdot \rceil$ represents rounding up to an integer, and $\sqrt{P1}$ and $\sqrt{P2}$ are the respective power adjustment factors corresponding to the TB1 and the TB2.

For another example, the following manner may also be adopted. The S1 and the S2 may be superposed to generate the complex symbol sequence S3 corresponding to the new TB in the following manner. When the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is $Xstd+Ystd \cdot i$, the S1 and the S2 may be superposed to generate the complex symbol sequence S3 expressed as $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, where a symbol $\lfloor \cdot \rfloor$ represents rounding down to an integer, and $\sqrt{P1}$ and $\sqrt{P2}$ are the respective power adjustment factors corresponding to the TB1 and the TB2.

For still another example, the S1 and the S2 may also be superposed to generate the complex symbol sequence S3 corresponding to the new TB in the following manner. The S2 is flipped to obtain a symbol S; and the S1 and the S are superposed to generate the S3 corresponding to the new TB.

In an exemplary embodiment, the symbol S may be obtained by flipping the S2 in a following manner. A sign of a real part of the S may be determined according to a value of a real part of the S1, a sign of an imaginary part of the S may be determined according to a value of an imaginary part of the S1, and the amplitude weighted complex symbol sequence S2 may be flipped to obtain the symbol S expressed as $\sqrt{P2} \cdot [(-1)^{\lceil Xstd''/2 \rceil} \cdot x2 + (-1)^{\lceil Ystd''/2 \rceil} \cdot y2 \cdot i]$ or $\sqrt{P2} \cdot [(-1)^{\lfloor Xstd''/2 \rfloor} \cdot x2 + (-1)^{\lfloor Ystd''/2 \rfloor} \cdot y2 \cdot i]$, where a non-normalized integer lattice constellation symbol $S_{std}$ corresponding to the S1 is $Xstd+Ystd \cdot i$, and the symbol S and the amplitude weighted complex symbol sequence S2 are identical in power.

The amplitude weighted complex symbol sequence S1 may be obtained by multiplying a power-normalized modulation symbol sequence, obtained by modulating the TB1 by a power-normalized constellation graph, by a power adjustment factor; and the amplitude weighted complex symbol sequence S2 may be obtained by multiplying a power-normalized modulation symbol sequence, obtained by modulating the TB2 by a power-normalized constellation graph, by a power adjustment factor.

In addition, values of Xstd and Ystd may adopt multiple values according to different modulation schemes. For example, the values may adopt at least one of the following values: values of Xstd and Ystd corresponding to QPSK which are {1, −1}; values of Xstd and Ystd corresponding to 16QAM which are {1, −1, 3, −3}; or values of Xstd and Ystd corresponding to 64QAM which are {1, −1, 3, −3, 5, −5, 7, −7}.

FIG. 3 is a flowchart of a data receiving method for dual TBs according to an embodiment of the present disclosure. As shown in FIG. 3, the flow may include the acts as follows.

At act S302, a transmitting signal is received from a transmitter, where the transmitting signal is a new TB generated at the transmitter by superposing, after dividing data to be transmitted into two portions, transport blocks TB1 and TB2 corresponding to each portion on the transmitter, the TB1 is modulated into an amplitude weighted complex symbol sequence S1, the TB2 is modulated into an amplitude weighted complex symbol sequence S2, the S1 and the S2 are superposed to generate a complex symbol sequence S3 corresponding to the new TB, and the complex symbol sequence S3 corresponding to the new TB possesses Gray properties.

At act S304, two TBs are demodulated out by using an SIC method.

By means of the abovementioned acts, a new TB obtained by superposing two TBs transmitted by the transmitter is received, where a complex symbol sequence corresponding to the new TB possesses Gray properties, and the received transmitting signal is demodulated. The problem in related communication technologies where constellation points finally combined by directly superposing two TBs do not possess Gray mapping properties is solved, thus achieving the effects of improving the spectral efficiency, endowing superposed symbol constellation points with Gray properties, improving the SIC demodulation performance, and allocating different powers to different data streams.

Two TBs may be demodulated out by using an SIC method in multiple processing manners. For example, TB1 information may be demodulated out with interference from TB2 information, and after the TB1 information is removed by using the SIC method, the TB2 information may be demodulated out by flipping.

In an exemplary embodiment, the act of demodulating TB1 information out with interference from TB2 information and after removing the TB1 information by using the SIC method, demodulating the TB2 information out by flipping may include the following acts. When the TB1 information demodulated is $x1'+y1' \cdot i$, information obtained by removing the TB1 information is $x2'+y2' \cdot i$, and a non-normalized integer lattice constellation symbol $S_{std}'$ corresponding to the TB1 is $Xstd'+Ystd' \cdot i$, a flipped output signal expressed as $(-1)^{\lceil Xstd'/2 \rceil} \cdot x2'+(-1)^{\lceil Ystd'/2 \rceil} \cdot y2' \cdot i$ or $(-1)^{\lfloor Xstd'/2 \rfloor} \cdot x2'+(-1)^{\lfloor Ystd'/2 \rfloor} \cdot y2' \cdot i$ may be obtained, where a symbol $\lceil \cdot \rceil$ represents rounding up to an integer, and a symbol $\lfloor \cdot \rfloor$ represents rounding down to an integer.

Likewise, values of Xstd' and Ystd' may include at least one of the following: values of Xstd' and Ystd' corresponding to QPSK, which may be {1, −1}; values of Xstd' and Ystd' corresponding to 16QAM, which may be {1, −1, 3, −3}; or values of Xstd' and Ystd' corresponding to 64QAM, which may be {1, −1, 3, −3, 5, −5, 7, −7}.

In the present embodiment, a data transmitting device for dual TBs is also provided. The device is arranged to implement the abovementioned embodiments and exemplary implementation modes. Those which have been described will not be elaborated herein. Just as a term 'module' used below, the combination of software and/or hardware with predetermined functions may be implemented. Although the device described by the following embodiment is better implemented by software, the implementation of hardware or the combination of software and hardware may be possible and conceived.

FIG. 4 is a block diagram of a data transmitting device for dual TBs according to an embodiment of the present disclosure. As shown in FIG. 4, the device may include a division module 42, a modulation module 44, a generation module 46 and a transmitting module 48. The device will be described hereinbelow.

The division module 42 is arranged to divide data to be transmitted into two portions, where transport blocks TB1 and TB2 are generated respectively according to a corresponding predetermined MCS for each portion. The modulation module 44 is coupled to the division module 42, and is arranged to modulate the TB1 into an amplitude weighted complex symbol sequence S1, and modulate the TB2 into an amplitude weighted complex symbol sequence S2. The generation module 46 is coupled to the modulation module 44, and is arranged to superpose the S1 and the S2 to generate a complex symbol sequence S3 corresponding to a new TB, where the complex symbol sequence S3 corresponding to the new TB possesses Gray properties. The transmitting module 48 is coupled to the generation module 46, and is arranged to transmit the new TB to a receiver.

Figure 5:
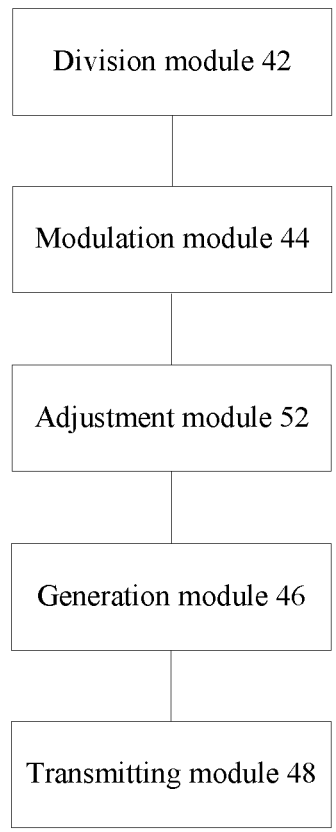
FIG. 5 is an exemplary block diagram of a data transmitting device for dual TBs according to an embodiment of the present disclosure.

FIG. 5 is an exemplary block diagram of a data transmitting device for dual TBs according to an embodiment of the present disclosure. As shown in FIG. 5, the device may include, in addition to all the modules shown in FIG. 4, an adjustment module 52. The adjustment module 52 will be described hereinbelow.

The adjustment module 52 is arranged to adjust the complex symbol sequence S3 corresponding to the new TB according to respective power adjustment factors $\sqrt{P1}$ and $\sqrt{P2}$ corresponding to the TB1 and the TB2, where $\sqrt{P1} > \sqrt{P2}$.

In an exemplary embodiment, the generation module 46 is further arranged to superpose the S1 and the S2 to generate the complex symbol sequence S3 corresponding to the new TB in a following manner: when the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2}(x2+y2 \cdot i)$, and a non-normalized integer lattice constellation symbol $S_{std}$ corresponding to the S1 is $Xstd+Ystd \cdot i$, superposing the S1 and the S2 to generate the complex symbol sequence S3 expressed as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, where a symbol $\lceil \cdot \rceil$ represents rounding up to an integer, and $\sqrt{P1}$ and $\sqrt{P2}$ are the respective power adjustment factors corresponding to the TB1 and the TB2.

In an exemplary embodiment, the generation module 46 may be further arranged to superpose the S1 and the S2 to generate the complex symbol sequence S3 corresponding to the new TB in a following manner: when the amplitude weighted complex symbol sequence S1 obtained by modulating the TB1 is $\sqrt{P1} \ (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is $Xstd+Ystd \cdot i$, superposing the S1 and the S2 to generate the complex symbol sequence S3 expressed as $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, where a symbol $\lfloor \cdot \rfloor$ represents rounding down to an integer, and $\sqrt{P1}$ and $\sqrt{P2}$ are the respective power adjustment factors corresponding to the TB1 and the TB2.

Figure 6:
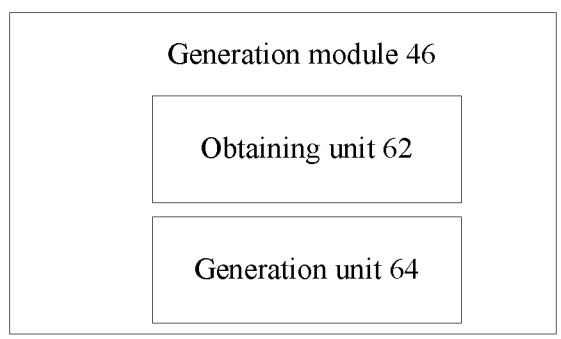
FIG. 6 is an exemplary block diagram of a generation module 46 in a data transmitting device for dual TBs according to an embodiment of the present disclosure.

FIG. 6 is an exemplary block diagram of a generation module 46 in a data transmitting device for dual TBs according to an embodiment of the present disclosure. As shown in FIG. 6, the generation module 46 may include an obtaining unit 62 and a generation unit 64. The generation module 46 will be described hereinbelow.

The obtaining unit 62 is arranged to flip the S2 to obtain a symbol S; and the generation unit 64 is coupled to the obtaining unit 62, and is arranged to superpose the S1 and the S to generate the S3 corresponding to the new TB.

In an exemplary embodiment, the obtaining unit 62 may be further arranged to obtain the symbol S by flipping the S2 in a following manner: determining a sign of a real part of the S according to a value of a real part of the S1, determining a sign of an imaginary part of the S according to a value of an imaginary part of the S1, and flipping the amplitude weighted complex symbol sequence S2 to obtain the symbol S expressed as $\sqrt{P2} \cdot [(-1)^{\lceil Xstd''/2 \rceil} \cdot x2 + (-1)^{\lceil Ystd''/2 \rceil} \cdot y2 \cdot i]$ or $\sqrt{P2} \cdot [(-1)^{\lfloor Xstd''/2 \rfloor} \cdot x2 + (-1)^{\lfloor Ystd''/2 \rfloor} \cdot y2 \cdot i]$, where a non-normalized integer lattice constellation symbol $S_{std}$ corresponding to the S1 is $Xstd + Ystd \cdot i$, and the symbol S and the amplitude weighted complex symbol sequence S2 are identical in power.

In an exemplary embodiment, the amplitude weighted complex symbol sequence S1 may be obtained by multiplying a power-normalized modulation symbol sequence, obtained by modulating the TB1 by a power-normalized constellation graph, by a power adjustment factor; and the amplitude weighted complex symbol sequence S2 may be obtained by multiplying a power-normalized modulation symbol sequence, obtained by modulating the TB2 by a power-normalized constellation graph, by a power adjustment factor.

In an exemplary embodiment, values of Xstd and Ystd are different according to different modulation schemes. For example, the values may include at least one of the following: values of Xstd and Ystd corresponding to QPSK, which may be {1, −1}; values of Xstd and Ystd corresponding to 16QAM, which may be {1, −1, 3, −3}; or values of Xstd and Ystd corresponding to 64QAM, which may be {1, −1, 3, −3, 5, −5, 7, −7}.

Figure 7:
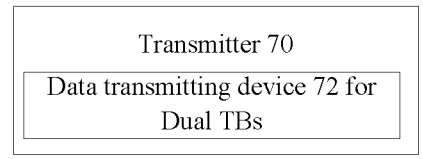
FIG. 7 is a block diagram of a transmitter according to an embodiment of the present disclosure.

FIG. 7 is a block diagram of a transmitter according to an embodiment of the present disclosure. As shown in FIG. 7, the transmitter 70 may include the data transmitting device 72 for dual TBs according to any one of the foregoing embodiments and exemplary embodiment.

Figure 8:
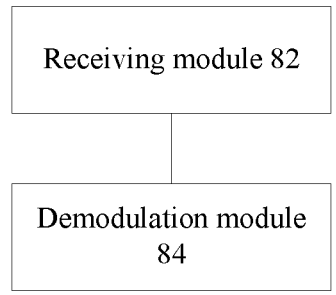
FIG. 8 is a block diagram of a data receiving device for dual TBs according to an embodiment of the present disclosure.

FIG. 8 is a block diagram of a data receiving device for dual TBs according to an embodiment of the present disclosure. As shown in FIG. 8, the device may include a receiving module 82 and a demodulation module 84. The device will be described hereinbelow.

The receiving module 82 is arranged to receive a transmitting signal from a transmitter, where the transmitting signal is a new TB generated at the transmitter by superposing, after dividing data to be transmitted into two portions, transport blocks TB1 and TB2 corresponding to each portion on the transmitter, the TB1 is modulated into an amplitude weighted complex symbol sequence S1, the TB2 is modulated into an amplitude weighted complex symbol sequence S2, the S1 and the S2 are superposed to generate a complex symbol sequence S3 corresponding to the new TB, and the complex symbol sequence S3 corresponding to the new TB possesses Gray properties; and the demodulation module 84 is coupled to the receiving module 82 and is arranged to demodulate two TBs out by using an SIC method.

Figure 9:
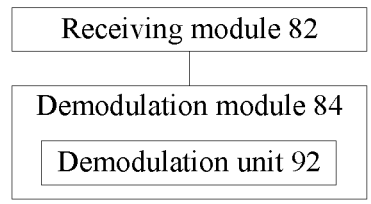
FIG. 9 is an exemplary block diagram of a demodulation module 84 in a data receiving device for dual TBs according to an embodiment of the present disclosure.

FIG. 9 is an exemplary block diagram of a demodulation module 84 in a data receiving device for dual TBs according to an embodiment of the present disclosure. As shown in FIG. 9, in an exemplary embodiment, the demodulation module 84 may include: a demodulation unit 92. The demodulation unit 92 will be described hereinbelow.

The demodulation unit 92 is arranged to demodulate TB1 information out with interference from TB2 information, and demodulate, after removing the TB1 information by using the SIC method, the TB2 information out by flipping.

In an exemplary embodiment, the demodulation unit 92 may be further arranged to demodulate TB1 information out with interference from TB2 information and demodulate, after removing the TB1 information by using the SIC method, the TB2 information out by flipping in a following manner: when the TB1 information demodulated is $x1' + y1' \cdot i$, information obtained by removing the TB1 information is $x2' + y2' \cdot i$, and a non-normalized integer lattice constellation symbol $S_{std}'$ corresponding to the TB1 is $Xstd' + Ystd' \cdot i$, obtaining a flipped output signal expressed as $(-1)^{\lceil Xstd''/2 \rceil} \cdot x2' + (-1)^{\lceil Ystd''/2 \rceil} \cdot y2' \cdot i$ or $(-1)^{\lfloor Xstd''/2 \rfloor} \cdot x2' + (-1)^{\lfloor Ystd''/2 \rfloor} \cdot y2' \cdot i$, where a symbol $\lceil \cdot \rceil$ represents rounding up to an integer, and a symbol $\lfloor \cdot \rfloor$ represents rounding down to an integer.

In an exemplary embodiment, values of Xstd' and Ystd' may include at least one of the following: values of Xstd' and Ystd' corresponding to QPSK, which may be {1, −1}; values of Xstd' and Ystd' corresponding to 16QAM, which may be {1, −1, 3, −3}; or values of Xstd' and Ystd' corresponding to 64QAM, which may be {1, −1, 3, −3, 5, −5, 7, −7}.

Figure 10:
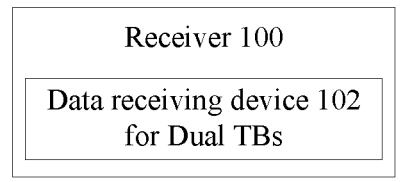
FIG. 10 is a block diagram of a receiver according to an embodiment of the present disclosure.

FIG. 10 is a block diagram of a receiver according to an embodiment of the present disclosure. As shown in FIG. 10, the receiver 100 may include the data receiving device 102 for dual TBs according to any one of the foregoing embodiments and exemplary embodiment.

The present embodiment is directed to the abovementioned problem in related communication technologies so as to provide a data transmission solution based on dual TBs. The solution is applicable to a procedure where a terminal UE transmits information to a base station or a base station transmits information to a terminal UE. In the solution, two TBs are not directly superposed, but superposed in a flipped superposition manner, thus improving the spectral efficiency in data transmission, and at the same time, endowing superposed symbol constellation points with Gray properties to improve the SIC demodulation performance. In addition, different powers may be simply and flexibly allocated to different data streams. The solution will be described hereinbelow.

A data transmission method based on dual TBs may include acts as follows. An end point for communication divides information bits into two portions, generates a TB for each portion according to an MCS, and then superposes two TBs together to form a new TB. A transmitting signal is formed by the superposed TB, and then the superposed TB is transmitted.

The superposition manner may be embodied as follows.

Dual TBs (TB1, TB2) are modulated into an amplitude weighted complex symbol sequence S1 and an amplitude weighted complex symbol sequence S2, which are superposed to generate a complex symbol sequence S3, where S3 is associated with S1 and S2 and possesses Gray properties.

S3 is adjusted according to respective power adjustment factors $\sqrt{P1}$ and $\sqrt{P2}$, where $\sqrt{P1} > \sqrt{P2}$.

A transmitter forms a transmitting signal by the complex symbol sequence generated after superposition, and transmits the transmitting signal to a receiver.

If an amplitude weighted complex symbol sequence S1, obtained by modulating the TB1, is $\sqrt{P1}\cdot(x1+y1\cdot i)$, an amplitude weighted complex symbol sequence S2, obtained by modulating the TB2, is $\sqrt{P2}(x2+y2\cdot i)$, and a non-normalized integer lattice constellation symbol $S_{std}$ corresponding to the S1 is Xstd+Ystd·i, then a complex symbol sequence S3 generated by superposing the S1 and the S2 may be expressed as $\sqrt{P1}\cdot(x1+y1\cdot i)+\sqrt{P2}\cdot[(-1)^{\lceil Xstd/2 \rceil}\cdot x2+(-1)^{\lceil Ystd/2 \rceil}\cdot y2\cdot i]$, where $\sqrt{P1}$ and $\sqrt{P2}$ are the respective power adjustment factors, and a symbol $\lceil\cdot\rceil$ represents rounding up to an integer.

Where, the non-normalized integer lattice constellation symbol $S_{std}$ is Xstd+Ystd·i. For example, values of Xstd and Ystd corresponding to QPSK may be {1, −1}; values of Xstd and Ystd corresponding to 16QAM may be {1, −1, 3, −3}; or values of Xstd and Ystd corresponding to 64QAM may be {1, −1, 3, −3, 5, −5, 7, −7}.

If an amplitude weighted complex symbol sequence S1, obtained by modulating the TB1, is $\sqrt{P1}\cdot(x1+y1\cdot i)$, an amplitude weighted complex symbol sequence S2, obtained by modulating the TB2, is $\sqrt{P2}(x2+y2\cdot i)$, and a non-normalized integer lattice constellation symbol $S_{std}$ corresponding to the S1 is Xstd+Ystd·i, then a complex symbol sequence S3 generated by superposing the S1 and the S2 may be expressed as $\sqrt{P1}\cdot(x1+y1\cdot i)+\sqrt{P2}\cdot[(-1)^{\lfloor Xstd/2 \rfloor}\cdot x2+(-1)^{\lfloor Ystd/2 \rfloor}\cdot y2\cdot i]$, where $\sqrt{P1}$ and $\sqrt{P2}$ are the respective power adjustment factors, and a symbol $\lfloor\cdot\rfloor$ represents rounding down to an integer.

The non-normalized integer lattice constellation symbol $S_{std}$ is Xstd+Ystd·i. For example, values of Xstd and Ystd corresponding to QPSK may be {1, −1}; values of Xstd and Ystd corresponding to 16QAM may be {1, −1, 3, −3}; or values of Xstd and Ystd corresponding to 64QAM may be {1, −1, 3, −3, 5, −5, 7, −7}.

The complex symbol sequences S1 and S2 may be superposed in a manner of directly superposing the amplitude weighted complex symbol sequence S1 and a symbol S obtained by flipping the amplitude weighted complex symbol sequence S2, where a complex symbol sequence S3 obtained by direct superposition may be expressed as (S1+S).

Before being superposed with the S1, the complex symbol sequences S2 may be flipped in a following manner. A sign of a real part of the S is determined according to a value of a real part of the S1, and a sign of an imaginary part of the S is determined according to a value of an imaginary part of the S1. The symbol S obtained by flipping the amplitude weighted complex symbol sequence S2 may be expressed as $\sqrt{P2}\cdot[(-1)^{\lceil Xstd/2 \rceil}\cdot x2+(-1)^{\lceil Ystd/2 \rceil}\cdot y2\cdot i]$ or $\sqrt{P2}\cdot[(-1)^{\lfloor Xstd/2 \rfloor}\cdot x2+(-1)^{\lfloor Ystd/2 \rfloor}\cdot y2\cdot i]$, where the symbol S and the amplitude weighted complex symbol sequence S2 are identical in power.

The amplitude weighted complex symbol sequence S1 may be obtained by multiplying a power-normalized modulation symbol sequence, obtained by modulating the TB1 by a power-normalized constellation graph, by a power adjustment factor. The amplitude weighted complex symbol sequence S2 may be obtained by multiplying a power-normalized modulation symbol sequence, obtained by modulating the TB2 by a power-normalized constellation graph, by a power adjustment factor.

The amplitude weighted complex symbol sequence S1, obtained by modulating the TB1, is $\sqrt{P1}(x1+y1\cdot i)$, and the amplitude weighted complex symbol sequence S2, obtained by modulating C2, is $\sqrt{P2}\cdot(x2+y2\cdot i)$. A power adjustment factor of the S1 is $\sqrt{P1}$, and a power adjustment factor of the S2 is $\sqrt{P2}$, where $\sqrt{P1}>\sqrt{P2}$. When $\sqrt{P1}$ is less than or equal to $\sqrt{P2}$, the symbol sequence S2 is not subjected to constellation flipping.

The S1 and the symbol obtained by flipping the S2 are directly superposed to obtain the S3. Constellation points of the S3 possess Gray properties. The superposed symbol constellation may also be enabled to possess Gray properties by means of other methods.

The transmitter forms a transmitting signal by the complex symbol sequence generated after superposition, and transmits the transmitting signal to the base station.

In the present embodiment, a data demodulation method based on dual TBs is also provided, which includes acts as follows. The base station demodulates TB1 information with interference from TB2 information, and after removing the TB1 information through SIC, outputs the TB2 information by flipping.

If the base station performs demodulation to obtain the TB1 information x1'+y1'·i, removes the TB1 information to obtain a signal x2'+·y2'·i, and a non-normalized integer lattice constellation symbol $S_{std}'$ corresponding to the demodulated TB1 is Xstd'+Ystd'·i, then a flipped output signal may be expressed as $(-1)^{\lceil Xstd''/2 \rceil}\cdot x2'+(-1)^{\lceil Ystd''/2 \rceil}\cdot y2'\cdot i$ or $(-1)^{\lfloor Xstd''/2 \rfloor}\cdot x2'+(-1)^{\lfloor Ystd''/2 \rfloor}\cdot y2'\cdot i$, where a symbol $\lceil\cdot\rceil$ represents rounding up to an integer, and a symbol $\lfloor\cdot\rfloor$ represents rounding down to an integer.

The non-normalized integer lattice constellation symbol $S_{std}'$ is Xstd'+Ystd'·i. For example, values of Xstd' and Ystd' corresponding to QPSK may be {1, −1}; values of Xstd' and Ystd' corresponding to 16QAM may be {1, −1, 3, −3}; or values of Xstd' and Ystd' corresponding to 64QAM may be {1, −1, 3, −3, 5, −5, 7, −7}.

By means of the data transmission solution based on dual TBs provided in the abovementioned embodiments, two TBs are not directly superposed, but superposed in a flipped superposition manner. The UE correspondingly flips a constellation of the TB2 and then superposes the TB1 and the flipped TB2. The base station demodulates TB1 information with interference from TB2 information, and outputs the TB2 information by flipping through SIC. The spectral efficiency may be improved for an uplink/downlink transmission system. In addition, superposed symbol constellation points are enabled to possess Gray properties, the SIC demodulation performance is improved, and different powers may be allocated to different data streams simply and flexibly.

Exemplary embodiments of the present disclosure will be described hereinbelow.

First Exemplary Embodiment

Figure 11:
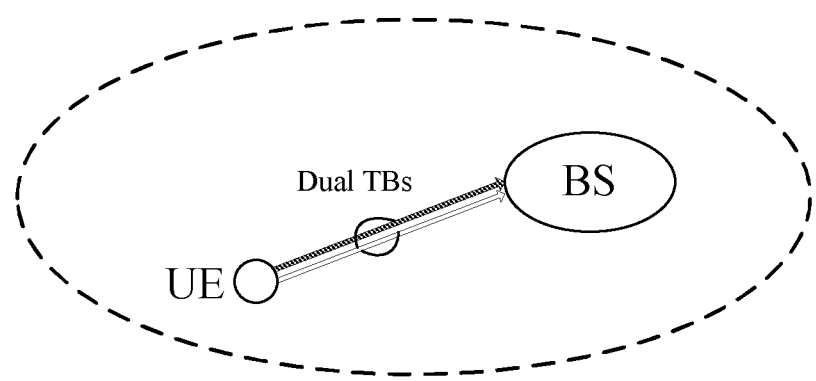
FIG. 11 is an abstract diagram of radio uplink transmission according to a first exemplary embodiment of the present disclosure.

FIG. 11 is an abstract diagram of radio uplink transmission according to a first exemplary embodiment of the present disclosure. As shown in FIG. 11, the data transmission method based on dual TBs may be applied to a radio uplink transmission scenario, and a UE transmits dual TB information (TB1, TB2) to a base station.

In accordance with the present exemplary embodiment, in the UE, the dual TBs (TB1, TB2) are modulated into an amplitude weighted complex symbol sequence S1 and an amplitude weighted complex symbol sequence S2, which are superposed to generate a complex symbol sequence S3, where S3 is associated with S1 and S2 and possesses Gray properties.

Firstly, the UE divides information bits to be transmitted into two portions, generates a TB for each portion according to an MCS, or generates an amplitude weighted complex symbol sequence S1 and an amplitude weighted complex symbol sequence S2 respectively, where the amplitude weighted complex symbol sequence S1 is obtained by multiplying a power-normalized modulation symbol sequence by a power adjustment factor, and the amplitude weighted complex symbol sequence S2 is obtained by multiplying a power-normalized modulation symbol sequence by a power adjustment factor. If a power adjustment factor of the S1 is $\sqrt{P1}$, a power adjustment factor of the S2 is $\sqrt{P2}$, and $\sqrt{P1}>\sqrt{P2}$, the amplitude weighted complex symbol sequence S1 is $\sqrt{P1}\cdot(x1+y1\cdot i)$, the amplitude weighted complex symbol sequence S2 is $\sqrt{P2}\cdot(x2+y2\cdot i)$, and a non-normalized integer lattice constellation symbol $S_{std}$ corresponding to the S1 is Xstd+Ystd·i. The non-normalized integer lattice constellation symbol $S_{std}$ is Xstd+Ystd·i. For example, values of Xstd and Ystd corresponding to QPSK may be {1, −1}; values of Xstd and Ystd corresponding to 16QAM may be {1, −1, 3, −3}; or values of Xstd and Ystd corresponding to 64QAM may be {1, −1, 3, −3, 5, −5, 7, −7}.

Then, the two TBs are superposed together to form a new TB. For example, the complex symbol sequences S1 and S2 may be superposed by flipping in a following manner: directly superposing the amplitude weighted complex symbol sequence S1 and a symbol S obtained by flipping the amplitude weighted complex symbol sequence S2, where a complex symbol sequence S3 obtained by direct superposition may be expressed as (S1+S) or may be expressed as $\sqrt{P1}\cdot(x1+y1\cdot i)+\sqrt{P2}\cdot[(-1)^{\lceil Xstd/2 \rceil}\cdot x2+(-1)^{\lceil Ystd/2 \rceil}\cdot y2\cdot i]$, where a symbol $\lceil \cdot \rceil$ represents rounding up to an integer.

The S3 is adjusted according to the respective power adjustment factors $\sqrt{P1}$ and $\sqrt{P2}$, where $\sqrt{P1}>\sqrt{P2}$.

The new TB obtained by superposition coding possesses Gray properties. A symbol constellation after superposition may be enabled to possess Gray properties by means of other methods. For example, a sign of a real part of the S is determined according to a value of a real part of the S1, and a sign of an imaginary part of the S is determined according to a value of an imaginary part of the S1. The symbol S obtained by flipping the amplitude weighted complex symbol sequence S2 may be expressed as $\sqrt{P2}\cdot[(-1)^{\lceil Xstd/2 \rceil}\cdot x2+(-1)^{\lceil Ystd/2 \rceil}\cdot y2\cdot i]$. The symbol S and the amplitude weighted complex symbol sequence S2 are identical in power.

Figure 12:
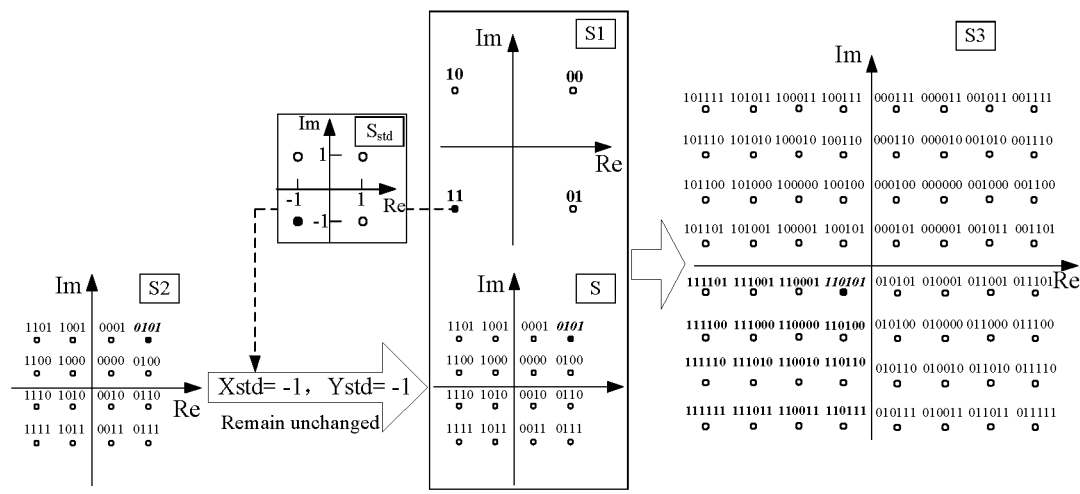
FIG. 12 is a schematic diagram of two groups of information susceptible to flipped superposition (remaining unchanged after flipping) after QPSK modulation and 16QAM modulation respectively according to a first exemplary embodiment of the present disclosure.
Figure 13:
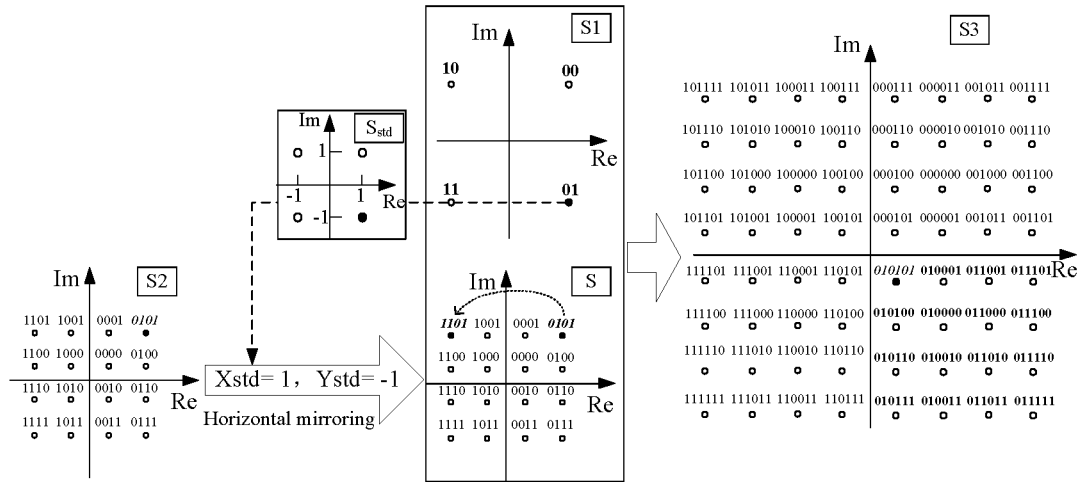
FIG. 13 is a schematic diagram of two groups of information susceptible to flipped superposition (horizontal flipping) after QPSK modulation and 16QAM modulation respectively according to a first exemplary embodiment of the present disclosure.

The abovementioned superposition manner will be illustrated hereinbelow. For example, a group of information is subjected to QPSK modulation according to a standard, and another group of information is subjected to 16QAM modulation according to a standard. FIG. 12 is a schematic diagram of two groups of information susceptible to flipped superposition (remaining unchanged after flipping) after QPSK modulation and 16QAM modulation respectively according to a first exemplary embodiment of the present disclosure. As shown in FIG. 12, flipping is performed in act 1. For example, if an S1 constellation point is '11', a symbol $S_{std}$ is −1−i, i.e., Xstd=−1, and Ystd=−1. So, an obtained S is $\sqrt{P2}\cdot(x2+y2\cdot i)$, identical to S2. After the act of flipping is completed, superposition is performed in act 2. A symbol S1 and the symbol S after flipping are directly superposed to obtain a superposed symbol S3. FIG. 13 is a schematic diagram of two groups of information susceptible to flipped superposition (horizontal flipping) after QPSK modulation and 16QAM modulation respectively according to a first exemplary embodiment of the present disclosure. As shown in FIG. 13, flipping is performed in act 1. For example, if an S1 constellation point is '01', a symbol $S_{std}$ is 1−i, i.e., Xstd=1, and Ystd=−1. So, an obtained S is $\sqrt{P2}\cdot(-x2+y2\cdot i)$, equivalent to horizontal flipping of S2. After the act of flipping is completed, superposition is performed in act 2. A symbol S1 and the symbol S after flipping are directly superposed to obtain a superposed symbol S3.

Finally, a superposed TB forms a transmitting signal, i.e., the UE forms the transmitting signal by the superposed symbol, and transmits the superposed TB to the base station.

At a receiving end, the base station demodulates TB1 information and TB2 information. The TB1 information is demodulated with interference from the TB2 information, and after SIC and flipping, the TB2 information is output, where the flipped output information is related to the demodulated TB1 information and the information after SIC.

In the present exemplary embodiment, the superposed symbol S3 is mapped by high-order (64QAM) Gray. It may be important to note that after two TBs are superposed, even if the receiver misjudges the symbol S1 due to existence of noise, the symbol S2 may be still correctly demodulated by flipping after demodulating the symbol S2. Thus, the SIC performance is obviously improved, so the new dual-TB flipped superposition transmission method is a valuable practical technology.

Second Exemplary Embodiment

In accordance with the present exemplary embodiment, in a UE, dual TBs (TB1, TB2) are modulated into an amplitude weighted complex symbol sequence S1 and an amplitude weighted complex symbol sequence S2, which are superposed to generate a complex symbol sequence S3, where S3 is associated with S1 and S2 and possesses Gray properties.

Firstly, the UE divides information bits to be transmitted into two portions, generates a TB for each portion according to an MCS, or generates an amplitude weighted complex symbol sequence S1 and an amplitude weighted complex symbol sequence S2 respectively, where the amplitude weighted complex symbol sequence S1 is obtained by multiplying a power-normalized modulation symbol sequence by a power adjustment factor, and the amplitude weighted complex symbol sequence S2 is obtained by multiplying a power-normalized modulation symbol sequence by a power adjustment factor. If a power adjustment factor of the S1 is $\sqrt{P1}$, a power adjustment factor of the S2 is $\sqrt{P2}$, and $\sqrt{P1}>\sqrt{P2}$, the amplitude weighted complex symbol sequence S1 is $\sqrt{P1}\cdot(x1+y1\cdot i)$, the amplitude weighted complex symbol sequence S2 is $\sqrt{P2}\cdot(x2+y2\cdot i)$, and a non-normalized integer lattice constellation symbol $S_{std}$ corresponding to the S1 is Xstd+Ystd·i. The non-normalized integer lattice constellation symbol $S_{std}$ is Xstd+Ystd·i. For example, values of Xstd and Ystd corresponding to QPSK may be {1, −1}; values of Xstd and Ystd corresponding to 16QAM may be {1, −1, 3, −3}; or values of Xstd and Ystd corresponding to 64QAM may be {1, −1, 3, −3, 5, −5, 7, −7}.

Then, the two TBs are superposed together to form a new TB. For example, the complex symbol sequences S1 and S2 may be superposed by flipping in a following manner: directly superposing the amplitude weighted complex symbol sequence S1 and a symbol S obtained by flipping the amplitude weighted complex symbol sequence S2, where a complex symbol sequence S3 obtained by direct superposition may be expressed as (S1+S) or may be expressed as $\sqrt{P1}\cdot(x1+y1\cdot i)+\sqrt{P2}\cdot[(-1)^{\lfloor Xstd/2 \rfloor}\cdot x2+(-1)^{\lfloor Ystd/2 \rfloor}\cdot y2\cdot i]$, where a symbol $\lfloor \cdot \rfloor$ represents rounding down to an integer.

The S3 is adjusted according to the respective power adjustment factors $\sqrt{P1}$ and $\sqrt{P2}$, where $\sqrt{P1}>\sqrt{P2}$.

The new TB obtained by superposition coding possesses Gray properties. A symbol constellation after superposition may be enabled to possess Gray properties by means of other methods. For example, a sign of a real part of the S is determined according to a value of a real part of the S1, and a sign of an imaginary part of the S is determined according to a value of an imaginary part of the S1. The symbol S obtained by flipping the amplitude weighted complex symbol sequence S2 may be expressed as $\sqrt{P2}[(-1)^{\lceil Xstd/2 \rceil} \cdot x2 + (-1)^{\lceil Ystd/2 \rceil} \cdot y2 \cdot i]$. The symbol S and the amplitude weighted complex symbol sequence S2 are identical in power.

Figure 14:
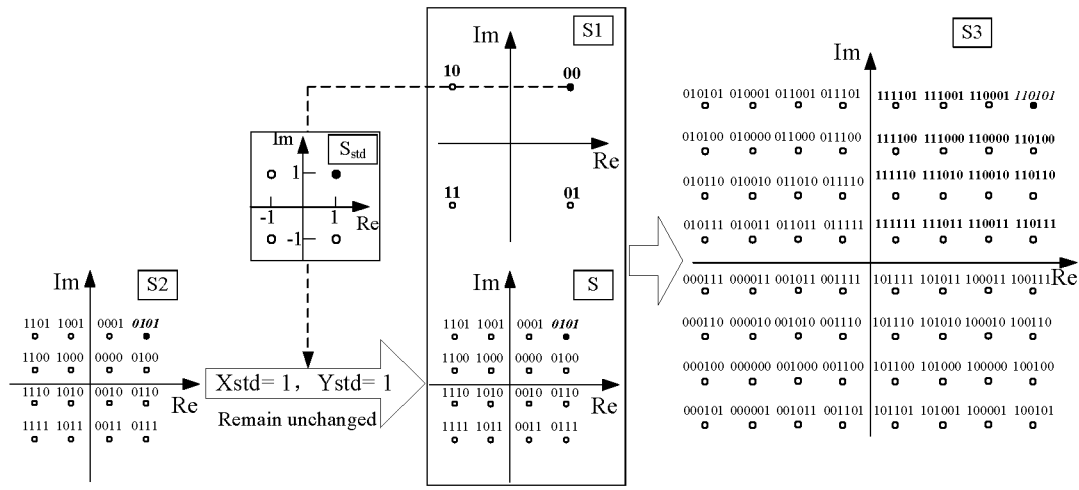
FIG. 14 is a schematic diagram of two groups of information susceptible to flipped superposition (remaining unchanged after flipping) after QPSK modulation and 16QAM modulation respectively according to a second exemplary embodiment of the present disclosure.
Figure 15:
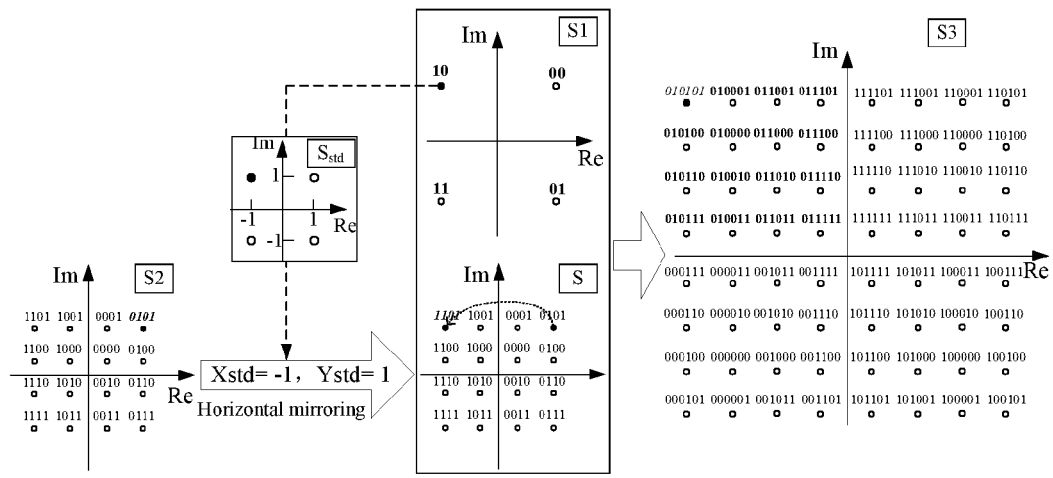
FIG. 15 is a schematic diagram of two groups of information susceptible to flipped superposition (horizontal flipping) after QPSK modulation and 16QAM modulation respectively according to a second exemplary embodiment of the present disclosure.

The abovementioned superposition manner will be illustrated hereinbelow. For example, a group of information is subjected to QPSK modulation according to a standard, and another group of information is subjected to 16QAM modulation according to a standard. FIG. 14 is a schematic diagram of two groups of information susceptible to flipped superposition (remaining unchanged after flipping) after QPSK modulation and 16QAM modulation respectively according to a second exemplary embodiment of the present disclosure. As shown in FIG. 14, flipping is performed in act 1. For example, if an S1 constellation point is '00', a symbol $S_{std}$ is 1+i, i.e., Xstd=1, and Ystd=1. So, an obtained S is $\sqrt{P2}(x2+y2 \cdot i)$, identical to S2. After the act of flipping is completed, superposition is performed in act 2. A symbol S1 and the symbol S after flipping are directly superposed to obtain a superposed symbol S3. FIG. 15 is a schematic diagram of two groups of information susceptible to flipped superposition (horizontal flipping) after QPSK modulation and 16QAM modulation respectively according to a second exemplary embodiment of the present disclosure. As shown in FIG. 15, flipping is performed in act 1. For example, if an S1 constellation point is '10', a symbol $S_{std}$ is −1+i, i.e., Xstd=−1, and Ystd=1. So, an obtained S is $\sqrt{P2}(-x2+y2 \cdot i)$, equivalent to horizontal flipping of S2. After the act of flipping is completed, superposition is performed in act 2. A symbol S1 and the symbol S after flipping are directly superposed to obtain a superposed symbol S3.

Finally, a superposed TB forms a transmitting signal, i.e., the UE forms the transmitting signal by the superposed symbol, and transmits the superposed TB to the base station.

At a receiving end, the base station demodulates TB1 information and TB2 information. The TB1 information is demodulated with interference from the TB2 information, and after SIC and flipping, the TB2 information is output, where the flipped output information is related to the demodulated TB1 information and the information after SIC.

In the present exemplary embodiment, the superposed symbol S3 is mapped by high-order (64QAM) Gray. It may be important to note that after two TBs are superposed, even if the receiver misjudges the symbol S1 due to existence of noise, the symbol S2 may be still correctly demodulated by flipping after demodulating the symbol S2. Thus, the SIC performance is obviously improved, so the new dual-TB flipped superposition transmission method is a valuable practical technology.

Third Exemplary Embodiment

Figure 16:
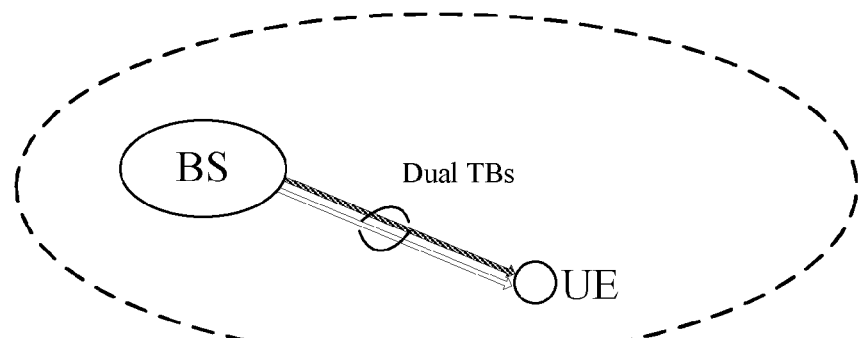
FIG. 16 is an abstract diagram of radio downlink transmission according to a third exemplary embodiment of the present disclosure.

FIG. 16 is an abstract diagram of radio downlink transmission according to a third exemplary embodiment of the present disclosure. As shown in FIG. 16, the method may be applied to a radio downlink transmission scenario, and a base station transmits dual TB information (TB1, TB2) to a UE.

In accordance with the present exemplary embodiment, in the base station, the dual TBs (TB1, TB2) are modulated into an amplitude weighted complex symbol sequence S1 and an amplitude weighted complex symbol sequence S2, which are superposed to generate a complex symbol sequence S3, where S3 is associated with S1 and S2 and possesses Gray properties.

Firstly, the base station divides information bits to be transmitted into two portions, generates a TB for each portion according to an MCS, or generates an amplitude weighted complex symbol sequence S1 and an amplitude weighted complex symbol sequence S2 respectively, where the amplitude weighted complex symbol sequence S1 is obtained by multiplying a power-normalized modulation symbol sequence by a power adjustment factor, and the amplitude weighted complex symbol sequence S2 is obtained by multiplying a power-normalized modulation symbol sequence by a power adjustment factor. If a power adjustment factor of the S1 is $\sqrt{P1}$, a power adjustment factor of the S2 is $\sqrt{P2}$, and $\sqrt{P1} > \sqrt{P2}$, the amplitude weighted complex symbol sequence S1 is $\sqrt{P1} \cdot (x1+y1 \cdot i)$, the amplitude weighted complex symbol sequence S2 is $\sqrt{P2} \cdot (x2+y2 \cdot i)$, and a non-normalized integer lattice constellation symbol $S_{std}$ corresponding to the S1 is Xstd+Ystd·i. The non-normalized integer lattice constellation symbol $S_{std}$ is Xstd+Ystd·i. For example, values of Xstd and Ystd corresponding to QPSK may be {1, −1}; values of Xstd and Ystd corresponding to 16QAM may be {1, −1, 3, −3}; or values of Xstd and Ystd corresponding to 64QAM may be {1, −1, 3, −3, 5, −5, 7, −7}.

Then, the two TBs are superposed together to form a new TB. For example, the complex symbol sequences S1 and S2 may be superposed by flipping in a following manner: directly superposing the amplitude weighted complex symbol sequence S1 and a symbol S obtained by flipping the amplitude weighted complex symbol sequence S2, where a complex symbol sequence S3 obtained by direct superposition may be expressed as (S1+S) or may be expressed as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, where a symbol $\lceil \cdot \rceil$ represents rounding up to an integer.

The S3 is adjusted according to the respective power adjustment factors $\sqrt{P1}$ and $\sqrt{P2}$, where $\sqrt{P1} > \sqrt{P2}$.

The new TB obtained by superposition coding possesses Gray properties. A symbol constellation after superposition may be enabled to possess Gray properties by means of other methods. For example, a sign of a real part of the S is determined according to a value of a real part of the S1, and a sign of an imaginary part of the S is determined according to a value of an imaginary part of the S1. The symbol S obtained by flipping the amplitude weighted complex symbol sequence S2 may be expressed as $\sqrt{P2} \cdot [(-1)^{\lceil Xstd/2 \rceil} \cdot x2 + (-1)^{\lceil Ystd/2 \rceil} \cdot y2 \cdot i]$. The symbol S and the amplitude weighted complex symbol sequence S2 are identical in power.

Figure 17:
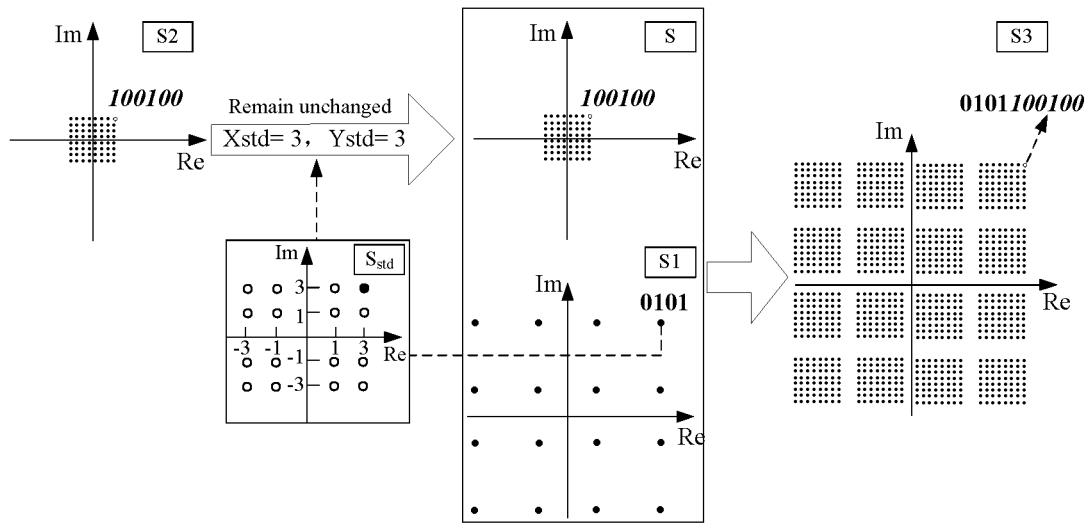
FIG. 17 is a schematic diagram of two groups of information susceptible to flipped superposition (remaining unchanged after flipping) after 16QAM modulation and 64QAM modulation respectively according to a third exemplary embodiment of the present disclosure.
Figure 18:
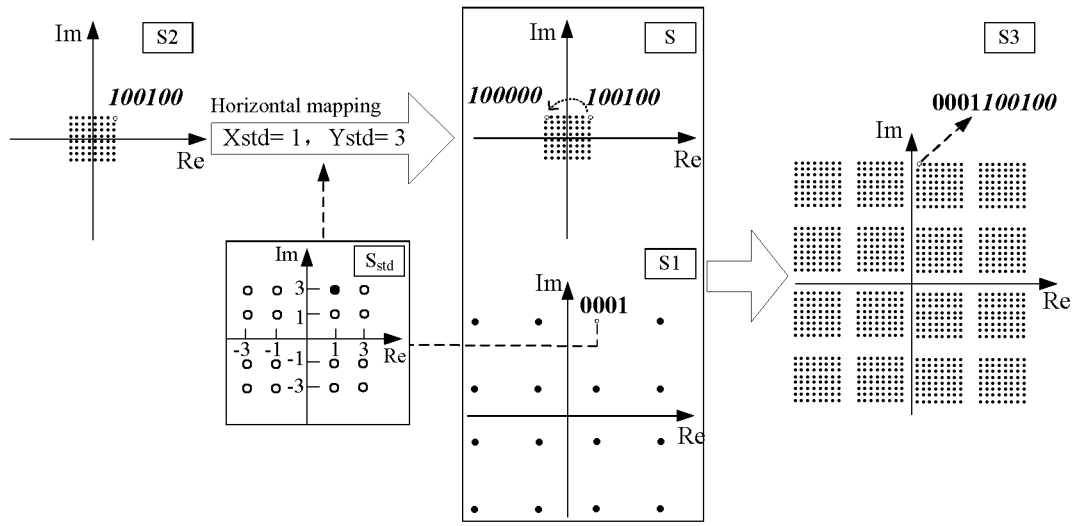
FIG. 18 is a schematic diagram of two groups of information susceptible to flipped superposition (horizontal flipping) after 16QAM modulation and 64QAM modulation respectively according to a third exemplary embodiment of the present disclosure.

The abovementioned superposition manner will be illustrated hereinbelow. For example, a group of information is subjected to 16QAM modulation according to a standard, and another group of information is subjected to 64QAM modulation according to a standard. FIG. 17 is a schematic diagram of two groups of information susceptible to flipped superposition (remaining unchanged after flipping) after 16QAM modulation and 64QAM modulation respectively according to a third exemplary embodiment of the present disclosure. As shown in FIG. 17, flipping is performed in act 1. For example, if an S1 constellation point is '0101', a symbol $S_{std}$ is 3+3i, i.e., Xstd=3, and Ystd=3. So, an obtained S is $\sqrt{P2}(x2+y2 \cdot i)$, identical to S2. After the act of flipping is completed, superposition is performed in act 2. A symbol S1 and the symbol S after flipping are directly superposed to obtain a superposed symbol S3. FIG. 18 is a schematic diagram of two groups of information susceptible to flipped superposition (horizontal flipping) after 16QAM modulation and 64QAM modulation respectively according to a third exemplary embodiment of the present disclosure. As shown in FIG. 18, flipping is performed in act 1. For example, if an S1 constellation point is '0001', a symbol $S_{std}$ is 1+3i, i.e., Xstd=1, and Ystd=3. So, an obtained S is $\sqrt{P2}\cdot(-x2+y2\cdot i)$, equivalent to horizontal flipping of S2. After the act of flipping is completed, superposition is performed in act 2. A symbol S1 and the symbol S after flipping are directly superposed to obtain a superposed symbol S3.

Finally, a superposed TB forms a transmitting signal, i.e., the base station forms the transmitting signal by the superposed symbol, and transmits the superposed TB to the UE.

At a receiving end, the UE demodulates TB1 information and TB2 information. The TB1 information is demodulated with interference from the TB2 information, and after SIC and flipping, the TB2 information is output, where the flipped output information is related to the demodulated TB1 information and the information after SIC.

In the present exemplary embodiment, the superposed symbol S3 is mapped by high-order (1024QAM) Gray. It may be important to note that after two TBs are superposed, even if the receiver misjudges the symbol S1 due to existence of noise, the symbol S2 may be still correctly demodulated by flipping after demodulating the symbol S2. Thus, the SIC performance is obviously improved, so the new dual-TB flipped superposition transmission method is a valuable practical technology.

Obviously, a person skilled in the art shall understand that all of the abovementioned modules or acts in the embodiments of the present disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices, the shown or described acts may be executed in a sequence different from this sequence under certain conditions, or they are manufactured into each integrated circuit module respectively, or multiple modules or acts therein are manufactured into a single integrated circuit module. Thus, the present disclosure is not limited to a combination of any specific hardware and software.

The above is only the exemplary embodiments of the present disclosure, and not intended to limit the present disclosure. As will occur to a person skilled in the art, the present disclosure is susceptible to various modifications and changes. Any modifications, equivalent replacements, improvements and the like made within the principle of the present disclosure shall fall within the scope of protection defined in the appended claims of the present disclosure.

INDUSTRIAL APPLICABILITY

As above, by means of the abovementioned embodiments and exemplary implementation modes, the problem in related communication technologies where constellation points finally combined by directly superposing two TBs do not possess Gray mapping properties is solved, thus achieving the effects of improving the spectral efficiency, endowing superposed symbol constellation points with Gray properties, improving the SIC demodulation performance, and allocating different powers to different data streams.

What is claimed is:

1. A data transmitting method for dual Transport Blocks (TBs), comprising:
   dividing data to be transmitted into two portions, wherein transport blocks TB1 and TB2 are generated respectively according to a corresponding predetermined Modulation Coding Scheme (MCS) for each portion;
   modulating the TB1 into an amplitude weighted complex symbol sequence S1, and modulating the TB2 into an amplitude weighted complex symbol sequence S2;
   superposing the S1 and the S2 to generate a complex symbol sequence S3 corresponding to a new TB, wherein the complex symbol sequence S3 corresponding to the new TB possesses Gray properties; and
   transmitting the new TB to a receiver;
   wherein before the new TB is transmitted to the receiver, the method further comprising: adjusting the complex symbol sequence S3 corresponding to the new TB according to respective power adjustment factors $\sqrt{P1}$ and $\sqrt{P2}$ corresponding to the TB1 and the TB2, where $\sqrt{P1} \geq \sqrt{P2}$.

2. The data transmitting method for dual TBs as claimed in claim 1, wherein superposing the S1 and the S2 to generate the complex symbol sequence S3 corresponding to the new TB comprises:
   when the amplitude weighted complex symbol sequence S1 obtained by modulating the TB1 is $\sqrt{P1}\cdot(x1+y1\cdot i)$, the amplitude weighted complex symbol sequence S2 obtained by modulating the TB2 is $\sqrt{P2}\cdot(x2+y2\cdot i)$, and a non-normalized integer lattice constellation symbol $S_{std}$ corresponding to the S1 is Xstd+Ystd·i, superposing the S1 and the S2 to generate the complex symbol sequence S3 expressed as $\sqrt{P1}\cdot(x1+y1\cdot i)+\sqrt{P2}\cdot[(-1)^{\lceil Xstd/2 \rceil}\cdot x2+(-1)^{\lceil Ystd/2 \rceil}\cdot y2\cdot i]$, where a symbol $\lceil \cdot \rceil$ represents rounding up to an integer;
   or,
   when the amplitude weighted complex symbol sequence S1 obtained by modulating the TB1 is $\sqrt{P1}\cdot(x1+y1\cdot i)$, the amplitude weighted complex symbol sequence S2 obtained by modulating the TB2 is $\sqrt{P2}\cdot(x2+y2\cdot i)$, and a non-normalized integer lattice constellation symbol $S_{std}$ corresponding to the S1 is Xstd+Ystd·i, superposing the S1 and the S2 to generate the complex symbol sequence S3 expressed as $\sqrt{P1}\cdot(x1+y1\cdot i)+\sqrt{P2}\cdot[(-1)^{\lfloor Xstd/2 \rfloor}\cdot x2+(-1)^{\lfloor Ystd/2 \rfloor}\cdot y2\cdot i]$, where a symbol $\lfloor \cdot \rfloor$ represents rounding down to an integer;
   or,
   flipping the S2 to obtain a symbol S; and superposing the S1 and the S to generate the S3 corresponding to the new TB.

3. The data transmitting method for dual TBs as claimed in claim 2, wherein the symbol S is obtained by flipping the S2 in a following manner:
   determining a sign of a real part of the S according to a value of a real part of the S1, determining a sign of an imaginary part of the S according to a value of an imaginary part of the S1, and flipping the amplitude weighted complex symbol sequence S2 to obtain the symbol S expressed as $\sqrt{P2}\cdot[(-1)^{\lceil Xstd/2 \rceil}\cdot x2+(-1)^{\lceil Ystd/2 \rceil}\cdot y2\cdot i]$ or $\sqrt{P2}\cdot[(-1)^{\lfloor Xstd/2 \rfloor}\cdot x2+(-1)^{\lfloor Ystd/2 \rfloor}\cdot y2\cdot i]$, where a non-normalized integer lattice constellation symbol $S_{std}$ corresponding to the S1 is Xstd+Ystd·i, and the symbol S and the amplitude weighted complex symbol sequence S2 are identical in power.

4. The data transmitting method for dual TBs as claimed in claim 1, wherein
the amplitude weighted complex symbol sequence S1 is obtained by multiplying a power-normalized modulation symbol sequence, obtained by modulating the TB1 by a power-normalized constellation graph, by a power adjustment factor; and
the amplitude weighted complex symbol sequence S2 is obtained by multiplying a power-normalized modulation symbol sequence, obtained by modulating the TB2 by a power-normalized constellation graph, by a power adjustment factor.

5. The data transmitting method for dual TBs as claimed in claim 2, wherein values of Xstd and Ystd comprise at least one of the following:
values of Xstd and Ystd corresponding to Quadrature Phase Shift Keying (QPSK) which are $\{1, -1\}$; values of Xstd and Ystd corresponding to 16 Quadrature Amplitude Modulation (QAM) which are $\{1, -1, 3, -3\}$; or values of Xstd and Ystd corresponding to 64QAM which are $\{1, -1, 3, -3, 5, -5, 7, -7\}$.

6. A data transmitting device for dual Transport Blocks (TBs), comprising a hardware processor arranged to execute program modules comprising:
a division module, arranged to divide data to be transmitted into two portions, wherein transport blocks TB1 and TB2 are generated respectively according to a corresponding predetermined Modulation Coding Scheme (MCS) for each portion;
a modulation module, arranged to modulate the TB1 into an amplitude weighted complex symbol sequence S1, and modulate the TB2 into an amplitude weighted complex symbol sequence S2;
a generation module, arranged to superpose the S1 and the S2 to generate a complex symbol sequence S3 corresponding to a new TB, wherein the complex symbol sequence S3 corresponding to the new TB possesses Gray properties; and
a transmitting module, arranged to transmit the new TB to a receiver;
wherein the hardware processor is arranged to execute program modules comprising: an adjustment module, arranged to adjust the complex symbol sequence S3 corresponding to the new TB according to respective power adjustment factors $\sqrt{P1}$ $\sqrt{P2}$ corresponding to the TB1 and the TB2, where $\sqrt{P1} > \sqrt{P2}$.

7. The data transmitting device for dual TBs as claimed in claim 6, wherein the generation module is further arranged to superpose the S1 and the S2 to generate the complex symbol sequence S3 corresponding to the new TB in a following manner:
when the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is Xstd+Ystd·i, superposing the S1 and the S2 to generate the complex symbol sequence S3 expressed as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, where a symbol $\lceil \cdot \rceil$ represents rounding up to an integer;
or,
when the amplitude weighted complex symbol sequence S1 obtained by modulating the TB1 is $\sqrt{P1} \cdot (x1+y1 \cdot i)$, the amplitude weighted complex symbol sequence S2 obtained by modulating the TB2 is $\sqrt{P2} \cdot (x2+y2 \cdot i)$, and a non-normalized integer lattice constellation symbol $S_{std}$ corresponding to the S1 is Xstd+Ystd·i, superposing the S1 and the S2 to generate the complex symbol sequence S3 expressed as $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, where a symbol $\lfloor \cdot \rfloor$ represents rounding down to an integer;
or,
the generation module comprises: an obtaining unit, arranged to flip the S2 to obtain a symbol S; and a generation unit, arranged to superpose the S1 and the S to generate the S3 corresponding to the new TB.

8. The data transmitting device for dual TBs as claimed in claim 7, wherein the obtaining unit is further arranged to obtain the symbol S by flipping the S2 in a following manner:
determining a sign of a real part of the S according to a value of a real part of the S1, determining a sign of an imaginary part of the S according to a value of an imaginary part of the S1, and flipping the amplitude weighted complex symbol sequence S2 to obtain the symbol S expressed as $\sqrt{P2} \cdot [(-1)^{\lceil Xstd/2 \rceil} \cdot x2 + (-1)^{\lceil Ystd/2 \rceil} \cdot y2 \cdot i]$ or $\sqrt{P2} \cdot [(-1)^{\lfloor Xstd/2 \rfloor} \cdot x2 + (-1)^{\lfloor Ystd/2 \rfloor} \cdot y2 \cdot i]$, where a non-normalized integer lattice constellation symbol $S_{std}$ corresponding to the S1 is Xstd+Ystd·i, and the symbol S and the amplitude weighted complex symbol sequence S2 are identical in power.

9. The data transmitting device for dual TBs as claimed in claim 6, wherein
the amplitude weighted complex symbol sequence S1 is obtained by multiplying a power-normalized modulation symbol sequence, obtained by modulating the TB1 by a power-normalized constellation graph, by a power adjustment factor; and
the amplitude weighted complex symbol sequence S2 is obtained by multiplying a power-normalized modulation symbol sequence, obtained by modulating the TB2 by a power-normalized constellation graph, by a power adjustment factor.

10. The data transmitting device for dual TBs as claimed in claim 7, wherein values of Xstd and Ystd comprise at least one of the following:
values of Xstd and Ystd corresponding to Quadrature Phase Shift Keying (QPSK) which are $\{1, -1\}$; values of Xstd and Ystd corresponding to 16 Quadrature Amplitude Modulation (QAM) which are $\{1, -1, 3, -3\}$; or values of Xstd and Ystd corresponding to 64QAM which are $\{1, -1, 3, -3, 5, -5, 7, -7\}$.

* * * * *